US007977920B2

(12) United States Patent
Pollak et al.

(10) Patent No.: US 7,977,920 B2
(45) Date of Patent: Jul. 12, 2011

(54) VOLTAGE-CONVERTER CIRCUIT AND METHOD FOR CLOCKED SUPPLY OF ENERGY TO AN ENERGY STORAGE

(75) Inventors: Markus Pollak, Erlangen (DE); Loreto Mateu, Nuremberg (DE); Peter Spies, Herzogenaurach (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 714 days.

(21) Appl. No.: 12/120,853

(22) Filed: May 15, 2008

(65) Prior Publication Data
US 2009/0284990 A1 Nov. 19, 2009

(51) Int. Cl.
*H01M 10/44* (2006.01)
*H01M 10/46* (2006.01)

(52) U.S. Cl. .................................................. 320/140
(58) Field of Classification Search .............. 320/107, 320/128, 137, 140, 142; 363/16, 21.04
See application file for complete search history.

(56) References Cited

U.S. PATENT DOCUMENTS
3,461,377 A 8/1969 Reese
2005/0041437 A1 2/2005 Chian et al.
2007/0147099 A1 6/2007 Tai et al.
2007/0210774 A1 9/2007 Kimura et al.
2008/0055940 A1* 3/2008 Lawson et al. ............... 363/16

FOREIGN PATENT DOCUMENTS
DE 1 155 850 A 10/1963
DE 2 204 019 A 8/1972
GB 1 341 327 A 12/1973
JP 2003-111298 A 4/2003

OTHER PUBLICATIONS

Official Communication issued in counterpart German Application No. 10 2008 023 515.6, mailed on Dec. 19, 2008.

* cited by examiner

*Primary Examiner* — Edward Tso
(74) *Attorney, Agent, or Firm* — Keating & Bennett, LLP

(57) ABSTRACT

The present invention provides a voltage converter circuit for the clocked supplying of energy to an energy storage, based on an input voltage present at an input of the voltage converter circuit. The voltage converter circuit comprises an energy storage and a switch assembly, the switch assembly comprising a first switch and a second switch connected in parallel and coupled to the energy storage. The first switch of the switch assembly exhibits, according to magnitude, a smaller turn-on voltage than the second switch, wherein a control terminal of the first switch is switched such that the first switch is active in a starting phase of the voltage converter circuit in order to supply the energy storage with energy, and wherein a control terminal of the second switch is switched such that the second switch is active after the starting phase in order to supply the energy storage with energy in a clocked manner.

46 Claims, 8 Drawing Sheets

VOLTAGE-CONVERTER CIRCUIT AND METHOD FOR CLOCKED SUPPLY OF ENERGY TO AN ENERGY STORAGE

Embodiments according to the invention relate to a voltage converter circuit for the clocked supplying of energy to an energy storage, based on an input voltage. Such a voltage converter circuit may, for example, be used in connection with an up-conversion of an output voltage of an energy source such as that of a thermogenerator or a solar cell. Embodiments according to the present invention further relate to a method of a clocked supplying of energy to an energy storage.

The technical field of application of embodiments according to the invention may be a voltage converter circuit, for example, which is capable of converting, even at a low and/or lower input voltage, this voltage with respect to its voltage value. In embodiments according to the invention, the matter of concern may be an upward voltage converter having coupled coils, which provides at its output a higher voltage than is present at its input. The voltage converter may be coupled to energy sources such as thermogenerators or solar cells, which only provide very low output voltage as the input voltage for the voltage converter. By the use of the inventive voltage converter circuit, high efficiency may be achieved with even smaller dimensions of the voltage transformer.

Conventional DC-DC up-converters are available in the form of an integrated circuit operating as of an input voltage of approx. 300 mV. The efficiency of these DC-DC up-converters is, however, mostly poor. DC-DC up-converters employed in commercial devices such as mobile telephones, laptops etc. are available fully integrated on a chip with the exception of at least one external coil. They provide high efficiency with input voltages above 1.8 V. Input voltages ranging below this value will, however, have the effect of rapidly decreasing the efficiency thereof. This means that energy sources, such as solar cells and thermogenerators, must be connected in a cascaded manner in order to be able to provide suitable voltage for a DC-DC converter or up-converter. With thermogenerators in particular, this is possible to a limited extent only if the dimensions of the total system are to be kept low. Therefore, there is a demand for a voltage converter circuit for energy sources supplying only very little output voltage, wherein this low output voltage may, with high efficiency, be converted to an altered output voltage of the voltage converter circuit while the dimensions are kept low.

It is the object of the present invention to provide a voltage converter circuit for the clocked supplying of energy to an energy storage, based on an input voltage, wherein the clocked supplying of energy may be effected with high efficiency and even at a comparatively low input voltage.

Furthermore, it is the object of the present invention to provide a method of the clocked supplying of energy to an energy storage based on an input voltage present at an input of a voltage converter circuit.

This object is achieved by a voltage converter circuit according to claim 1 and by a method according to claim 41.

The present invention provides a voltage converter circuit for the clocked supplying of energy to an energy storage, based on an input voltage present at an input of the voltage converter circuit. The voltage converter circuit includes an energy storage and a switch assembly, the switch assembly having a first switch and a second switch connected in parallel. The switch assembly is coupled to the energy storage. The first switch exhibits, according to magnitude, a turn-on voltage lower than that of the second switch. A control terminal of the first switch is switched such that the first switch is active in a starting phase of the voltage converter circuit in order to supply the energy storage with energy. A control terminal of the second switch is switched such that the second switch is active after the starting phase so as to supply the energy storage with energy in a clocked manner.

The present invention further provides a method of the clocked supplying of energy to an energy storage, based on an input voltage present at an input of a voltage converter circuit. The method comprises a step of supplying energy to the energy storage of the voltage converter circuit in a starting phase by activating a first switch, the first switch exhibiting, according to magnitude, a turn-on voltage lower than that of a second switch. Furthermore, the method comprises a supplying of energy, in a clocked manner, to the energy storage of the voltage converter circuit after the starting phase by activating the second switch. The second switch is connected in parallel to the first switch and exhibits, according to magnitude, a turn-on voltage higher than that of the first switch.

Some embodiments according to the present invention provide the possibility of coupling the energy storage, inductively or capacitively, to a feedback circuit so that the voltage converter circuit is excitable into self-oscillating oscillations, whereby an operating frequency of the clocked supplying of energy is determined.

In addition, some embodiments according to the present invention provide the advantage that, by means of a regulating circuit coupled to the control terminal of the second transistor, an operating frequency of the clocked supplying of energy is load-dependently controllable.

Some embodiments according to the present invention further offer the advantage that a feedback circuit inductively coupled to the energy storage comprises a switchable capacitive element configured to effect a stronger coupling effect in a starting phase than after the starting phase.

Embodiments of the present invention further offer the advantage that, using a normally on junction field-effect transistor (JFET) as the first switch and using a metal-oxide semiconductor field-effect transistor (MOSFET) as the second switch, the converting of a voltage already begins at a low input voltage in the starting phase by activating the normally on JFET, and that, after the starting phase, by activating the MOSFET, the converting may exhibit high efficiency.

In the following, embodiments according to the present invention are explained in greater detail referring to the accompanying drawings, in which.

Figure 1:
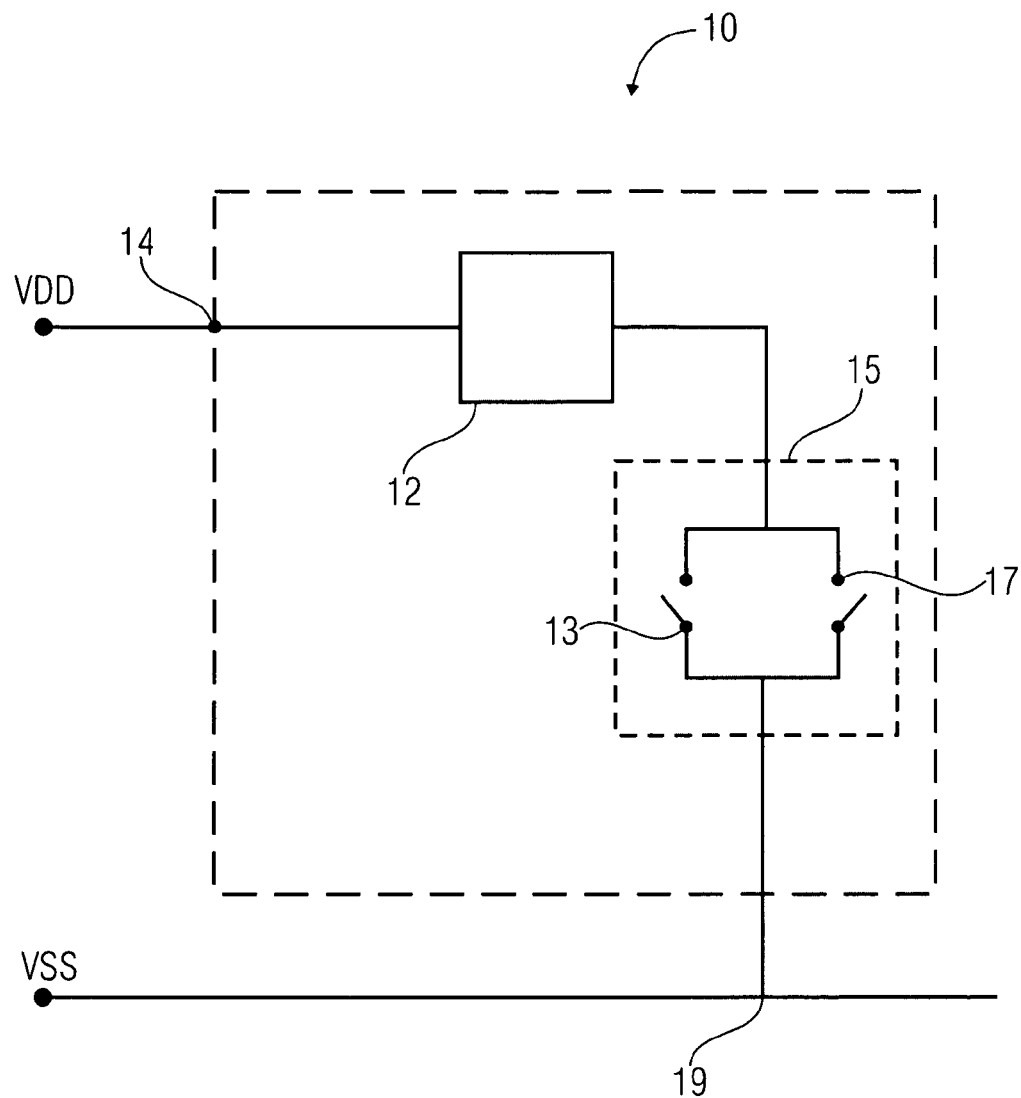
FIG. 1 is a block diagram of a voltage converter circuit for the clocked supplying of energy to an energy storage according to an embodiment of the present invention.

Referring to the following description of the embodiments of the present invention, it is to be taken into account that, for reasons of clarity, in the different figures and in the entire description, the same reference numerals are continuously used for functionally identical elements or equivalent elements or steps having the same effect or function.

In embodiments according to the present invention, voltage converter circuits for very low input voltages may be realized with high efficiency. These circuits are advantageous due to the small dimensions, so that, e.g., thermogenerators may be used in a simple manner for the generation of energy in the μW to mW range.

FIG. 1 shows a block diagram of an embodiment of a voltage converter circuit 10 according to the present invention. The voltage converter circuit 10 for the clocked supplying of energy to an energy storage based on an input voltage VDD present at an input 14 of the voltage converter circuit 10 comprises an energy storage 12 for storing energy and a switch assembly 15 coupled to the energy storage 12. The switch assembly 15 comprises a first switch 13 and a second switch 17, which are connected in parallel and coupled to the energy storage. The first switch 13 exhibits, according to magnitude, a lower turn-on voltage than the second switch 17. A control terminal 13a of the first switch is switched such that the first switch is active in a starting phase of the voltage converter circuit in order to supply the energy storage with energy. A control terminal 17a of the second switch 17 is switched such that the second switch is active after the starting phase in order to supply the energy storage with energy in a clocked manner.

The energy storage 12 may, e.g., be an inductive element, such as an induction coil. In applying an input voltage VDD to the input 14 of the voltage converter circuit 10, in a starting phase, for example, the first switch 13 may be active, i.e. closed, so that a time-variable current, such as a current increasing with time, flows through the coil from the input 14 to a reference potential VSS, as a result of which energy stored in a magnetic field of the coil increases. After a starting phase, the control terminal 17a of the second switch 17 may be controlled, on the basis of respective switching, such that the second switch 17 is closed and opened in a clocked manner. In phases when the second switch 17 is closed, also by a variable current flow through the coil 12, this coil 12 may be supplied with magnetic-field energy. With the first and/or second switches closed, the current may flow off to the reference potential VSS, which may be a ground potential, for example.

In another embodiment, the energy storage may, e.g., be a voltage converter circuit having a capacitive energy storage 12. This voltage converter circuit may then be integrated into a charge pump, for example. Embodiments of the present invention may therefore, for example, be an inductive converter circuit or a capacitive voltage converter circuit. If the voltage converter circuit contains a transformer having coupled coils, some embodiments according to the present invention may also be DC-DC converters.

Figure 2:
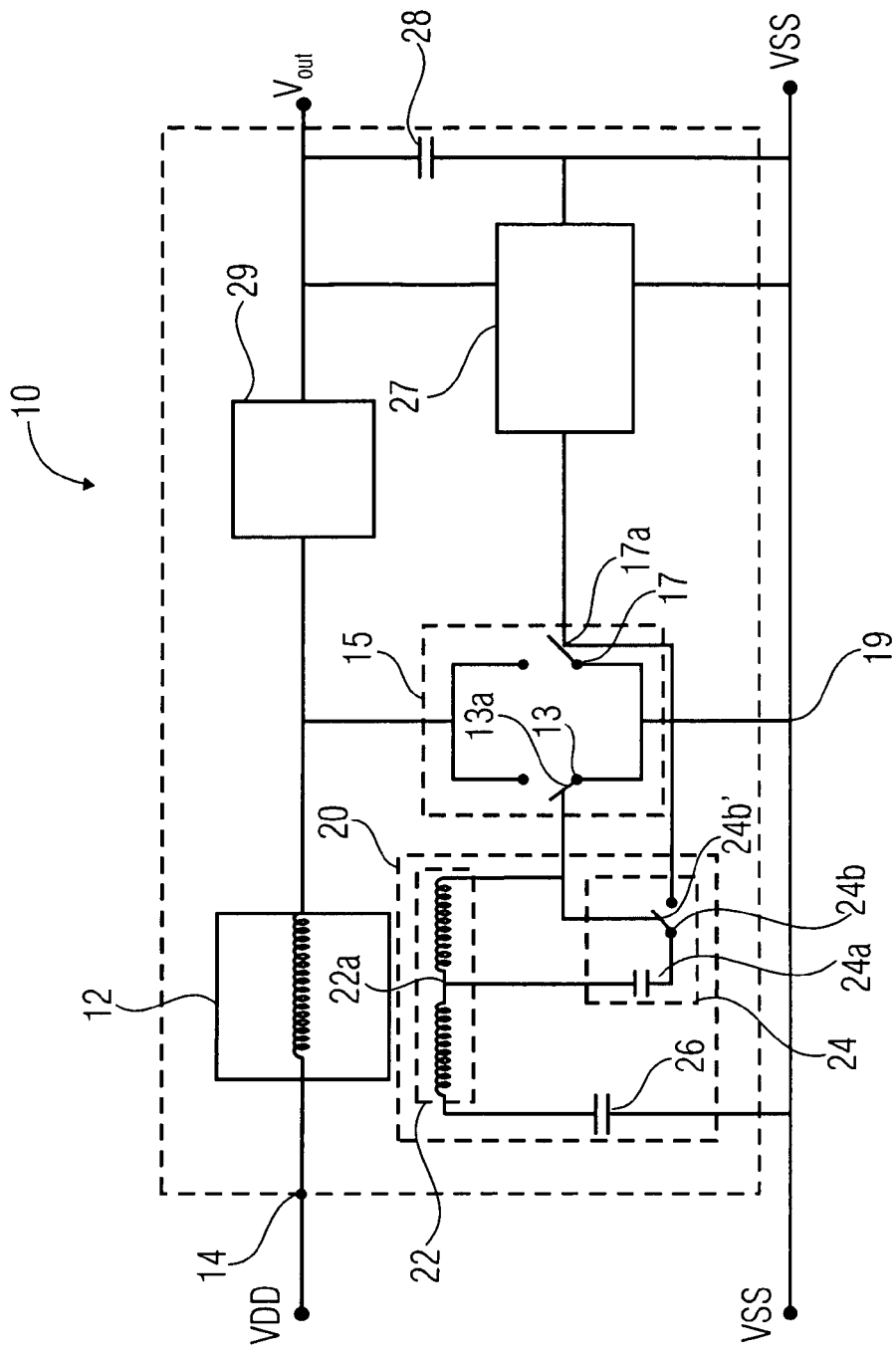
FIG. 2 is a further block diagram of a voltage converter circuit having a feedback circuit, a regulating circuit, an output capacitance and a controllable rectifier between the energy storage and the output capacitance, according to a further embodiment of the present invention.

FIG. 2 shows a further block diagram of an embodiment of a voltage converter circuit 10. The voltage converter circuit 10 comprises an energy storage 12 that may be configured in the form of an inductive element, i.e. in the form of a first coil or first induction coil, for example. This first induction coil 12 may be inductively coupled to an inductive element 22 of a feedback circuit 20. I.e., by altering the energy stored in the induction coil, i.e. when a time-variable current flows through the induction coil 12, voltage is induced in the inductive element 22. The feedback circuit 20 may further comprise a switchable capacitive element 24, which is configured to provide a stronger coupling effect between the inductive element 22 and the control terminal 17a of the second switch 17 in a starting phase than after the starting phase. The feedback circuit 20 may be configured for coupling a voltage to the control terminal 17a of the second switch 17 via the capacitive element 24 so that the second switch 17 is active and/or is controlled after the starting phase in order to supply the energy storage 12, i.e. the induction coil, with energy in a clocked manner. I.e., by applying, to the control terminal 17a of the second switch, a voltage coupled in via the capacitive element 24, the second switch may, e.g., be closed so that a time-variable current flow through the coil 12 to the reference potential VSS takes place, with the result that the coil 12 is supplied with magnetic energy.

The switchable capacitive element 24 of the feedback circuit 20 may be a capacitor 24a, for example, which is connected in series with a third switch 24b. The control terminal of the third switch 24b may be switched such that the switch is closed during the starting phase in order to thus achieve a stronger coupling to the control terminal 17a of the second switch 17 via the capacitor 24a than after a starting phase in which the third switch 24b is open. In the process, the capacitor 24a separates the DC voltage proportion of the induced voltage from the control terminal 17a of the second switch 17.

In a further embodiment, the feedback circuit 20 may be configured such that a terminal of the inductive element 22 is connected to a further capacitive element 26 of the feedback circuit 20. The capacitive element 26 may be configured to build up, in the starting phase, a potential opposite the reference potential VSS at the inductive element 22 by means of an induced voltage so that the control terminal 13a of the first switch 13, which is also coupled to the inductive element 22, is controlled such that, in the starting phase, supplying of energy to the induction coil 12 is reduced by periodic partial opening and closing of the first switch 13 until, after the starting phase, a potential is present at the capacitive element 26 so that the supplying of energy to the energy storage 12 is completed by opening the first switch 13.

The first, second and third switches may be transistors, for example. The first switch 13 may be a junction field-effect transistor (JFET), for example, that is, e.g., a normally on transistor that is switched on, i.e. already electrically conducting, at a control voltage of 0 V. The second switch may be a metal-oxide semiconductor field-effect transistor (MOSFET), for example, such as, e.g., an NMOS transistor or a PMOS transistor. The third switch 24b may again be a normally on JFET transistor.

Therefore, the first transistor 13 may therefore be a normally on transistor that is already current-carrying at a control voltage or gate voltage of 0 V, and the second switch 17 may be an MOSFET, for example, having a turn-on voltage higher than the turn-on or threshold voltage of the first transistor 17. In the starting phase of the voltage converter circuit 10, first only the first transistor, such as the JFET 13, may be active, as a voltage present at the input 14 may be low. However, as the JFET is a normally on device, current may already flow across the inductance 12, i.e. the energy storage, as of an input voltage just above 0 V. Therefore, a current across the induction coil 12 increases with starting up the converter so that a time-variable current will flow in the induction coil 12, thereby inducing a voltage in the inductive element 22. Due to the induced voltage, in this embodiment, a negative current may be induced in the inductive element 22, which may also be configured as a coil, so that the capacitive element 26 is charged with a low negative voltage. As, at the control terminal 13a of the JFET transistor 13, there is a p-n junction to the reference potential VSS, a low negative voltage may be formed at the capacitive element 26 in the course of time, due to the diode rectifying effect. At the point in time when an input voltage VDD becomes constant, the current flow in the induction coil 12 becomes constant or a rate of change of the current decreases, and no voltage or only a lower voltage is induced in the inductive element 22. As the control terminal, i.e. the gate terminal of the JFET transistor 13 is coupled to the capacitive element 26, which is on a small negative potential, the current flow through the JFET is reduced and the switch 13 is therefore opened. This serves to reduce the constant current flow through the induction coil 12.

Therefore, a voltage may again be induced into the feedback circuit 20 via the coupled inductive element 22. This switching cycle may now repeat at a constant input voltage. For the current flowing through the induction coil 12, the result is an exponential correlation with a time constant depending, among other things, on a serial equivalent resistance of the energy source supplying the input voltage 14. This time constant may be in the order of microseconds, for example, which is why a high negative voltage may be induced in the inductive element 22 until the current flow through the induction coil 12 reaches its maximum value. As the control terminal 13a, i.e. the gate terminal of the junction FET 13, is connected and coupled to the capacitive element 26, the junction FET is then closed again, which results in a reduction of the current through the induction coil 12. The cycle may then repeat.

If the voltage across the capacitive element 26 undershoots a certain negative value, i.e. is, for example, lower than a turn-on voltage of the first switch or first transistor 13, the first transistor 13 is no longer switched on, and the second switch 17 or the MOSFET becomes the switching transistor. That is, after the starting phase, the second switch or the MOSFET transistor 17 takes charge of the clocked supplying of energy to the energy storage 12.

According to embodiments of the present invention, the energy storage 12 may be coupled such to the feedback circuit 20 that, in dependence on a change of the energy stored in the energy storage 12, the voltage converter circuit may be excited into a self-oscillating oscillation. The energy storage may, e.g., also be an induction coil coupled inductively to the feedback circuit so that, in dependence on a change of the current flowing in the induction coil, the voltage converter circuit is excited into a self-oscillating oscillation. The DC-DC voltage converter circuit described herein is therefore, in embodiments, basically designed as a self-oscillating converter, i.e. the switches or switching transistors are not controlled via an active circuit but only via coupled coils of a transformer.

According to an embodiment of the present invention, the energy storage 12 may be coupled to a feedback circuit 20 such that, in dependence on a change of the energy stored in the energy storage or in dependence on an amount of the energy stored in the energy storage, a feedback signal is produced, which excites the voltage converter circuit into self-oscillating oscillations. Besides, the feedback circuit 20 may comprise a resistive element 25a and a capacitive element 26, so that the frequency of the self-oscillating oscillation for the clocked supplying of energy to the energy storage depends, among other things, on an RC time constant of the feedback circuit 20.

The voltage converter circuit for the clocked supplying of energy to an energy storage may also comprise a locked loop 27 configured for controlling the frequency or a duty cycle of the supplying of energy to the energy storage after the starting phase. For this purpose, the locked loop 27 may be coupled to a control terminal 17a of the second switch 17.

According to a further embodiment, the voltage converter circuit may be configured such that the energy storage 12 is coupled to an output capacitance 28 via a rectifying element, i.e. a diode, for example. At the output capacitance 28, in dependence on a charge transferred from the energy storage 12, an output voltage $V_{out}$ may be provided. In embodiments, this output voltage may be higher than an input voltage present at the input of the voltage converter circuit. The rectifier element 29 may be a switched rectifying element, i.e. a diode, for example, which is connected in parallel to a switch. The switch may, for example, be a transistor, the control terminal of which is switched in a predetermined manner.

According to some embodiments, the transfer of charges to the output capacitance 28 may be effected such that, after the starting phase, the energy storage 12 is supplied with energy in a clocked manner by closing the second switch 17. In a manner opposite to the clocked manner, charges may be transferred from the energy storage to the output capacitance 28. That is, after the starting phase and during the phase in which the switch 17 is closed, energy is temporarily stored in the energy storage 12. In the (clocked) phases in which the switch 17 is open, this energy and/or charge that was temporarily stored is transferred to the output capacitance 28 via the rectifying element 29. That is, the charges are "pumped" to the output capacitance in a manner opposite to the clocked manner, i.e., for example, when the switch 17 is open. There, an output voltage $V_{out}$ may form at the output capacitance 28, wherein the output voltage $V_{out}$ may differ, according to magnitude, from the input voltage with respect to its voltage value.

Controlling this clocked supplying of energy into the energy storage 12 and, in the opposite phases, the transferring of this temporarily stored energy to the output capacitance 28, may be aided and facilitated or effected by the locked loop 27. The output capacitance 28 functions as a second energy storage at the output of the voltage converter circuit so that an output voltage is provided that differs from the input voltage.

The locked loop 27 may be coupled to a control terminal of the second switch 17 for controlling, in dependence on a load at the output capacitance 28, a frequency for the clocked supplying of energy to the energy storage 12 and for the transferring of charges from the energy storage to the output capacitance 28, which is clocked in a manner opposite to the clocked supplying. For example, in an embodiment, the locked loop may be configured such that, the higher the load at the output capacitance, the frequency for the clocked supplying of energy and for transferring charges to the output capacitance 28 is decreased. I.e., in dependence on a load that is coupled to the output of the voltage converter circuit, i.e., for example, to the output capacitance 28, the frequency of the voltage conversion may be changed.

Figure 3:
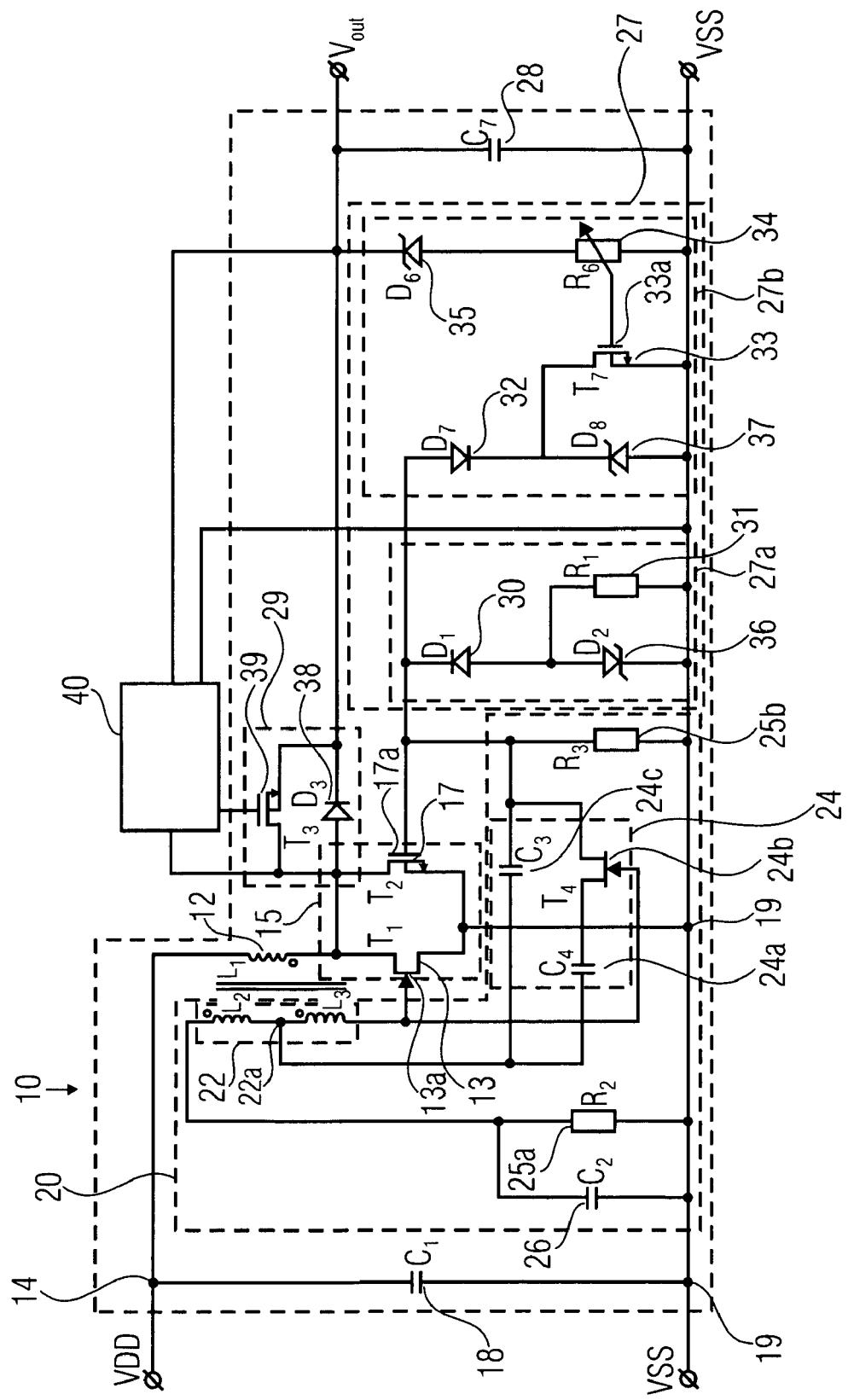
FIG. 3 is a circuit diagram of a voltage converter circuit for the clocked supplying of energy to an energy storage, according to a further embodiment of the present invention.

FIG. 3 shows the circuit diagram of a voltage converter circuit according to a further embodiment of the present invention. The voltage converter circuit 10 for the clocked supplying of energy to an energy storage based on an input voltage, in this embodiment, comprises an energy storage 12, which is configured as an inductive element, i.e. as a first coil, for example. At the input of the voltage converter circuit 14, there is present an input voltage VDD connected to the energy storage 12. In this embodiment, an input capacitor $C_1$ 18 may be coupled between the input voltage VDD and the reference potential VSS 19. In this embodiment, the energy storage 12 is connected to the switch assembly 15. In this embodiment, the switch assembly 15 comprises a normally on first JFET transistor $T_1$ or 13. Apart from that, the switch assembly 15 comprises a second MOSFET transistor $T_2$ or 17, here an exemplary NMOS transistor, which is connected in parallel to the JFET transistor $T_1$. The parallelly connected transistors $T_1$ and $T_2$ are coupled to the energy storage 12 and to a reference potential VSS 19. The normally on JFET transistor $T_1$, which operates as the first switch, exhibits, according to magnitude, lower input voltage than the NMOS transistor $T_2$ 17. For example, the JFET transistor 13 may exhibit a turn-on voltage or turn-on threshold voltage of 0 V.

In the embodiment shown, the energy storage 12 is magnetically and/or inductively coupled to the feedback circuit by an inductive element 22. In this embodiment, the inductive element 22 may consist of two induction coils $L_3$ and $L_2$. The inductive element 22 may be connected, via a tap 22a inserted between the second induction coil $L_2$ and the third induction coil $L_3$, to a switchable capacitive element 24. In this embodiment, the switchable capacitive element 24 consists of two capacitors C3 or 24c, and C4 or 24a, connected in parallel. The branch with the capacitor 24 or $C_4$ comprises a JFET transistor 24b or $T_4$, so that, depending on the switching of the capacitor 24b, the total capacitance of the capacitive element 24 may be increased. The JFET $T_4$ 24b may then be switched such that, in a starting phase of the voltage converter circuit, the total capacitance of the capacitive element 24 is increased. Therefore, in this embodiment, the capacitive element 24 is on the one hand connected to the tap 22a of the inductive element 22 and on the other hand connected to the control terminal 17a of the NMOS transistor $T_2$. The feedback circuit 20 further comprises a capacitive element 26 or $C_2$ and a resistive element 25a or $R_3$. This resistance/capacitance member (RC member of $C_2$ and $R_3$) is connected to a terminal of the second induction coil $L_2$ and to the reference potential VSS.

Furthermore, a further terminal of the third induction coil $L_3$ of the inductive element 22 is connected to the control terminals 13a of the JFET 13 and to the control terminal of the JFET 24b of the capacitive element 24.

The voltage converter circuit 10 described in this embodiment may be a DC-DC converter, for example, which is a self-oscillating converter as far as its basic concept is concerned. That is, the switching transistors of the voltage converter circuit need not be controlled via an active circuit but are controlled via coupled coils of a transformer only, so that what results is a self-oscillating oscillation of the DC-DC converter.

In applying an input voltage VDD at an input 14, it is the JFET $T_1$ 13 that first operates in a starting phase. As the JFET is a normally on device, current already starts building up as of an input voltage above 0V in the inductance $L_1$, i.e. the energy storage 12 of the transformer. As the input voltage increases when the converter is started up, the current through the induction coil $L_1$ also increases so that a voltage is induced in the second induction coil $L_2$ and the third induction coil $L_3$, and the converter starts oscillating. As soon as the voltage at the tap 22a between the second induction coil $L_2$ and the third induction coil $L_3$ of the transformer is large enough, the MOSFET transistor $T_2$ or 17, turns on and takes over carrying current in the voltage converter.

That is, in a starting phase, first the JFET 13 is active, i.e. a current flows through the first coil $L_1$ to the reference potential VSS 19 via the JFET. As a result, a voltage is coupled into the feedback circuit 20 via the inductive element 22. In this starting phase, by the connection of the inductive element 22 to the JFET 24b of the capacitive element 24, the capacitor 24a may be added to the capacitance of the capacitor 24c so that a stronger coupling effect on the control terminal 17a of the second transistor 17 may be established in the starting phase than after a starting phase, in which the JFET 24b is turned off so that the total capacitance of the capacitive element 24 is reduced.

As a result of the current through the first coil 12 increasing, in this embodiment, a negative current is induced in the inductive element 22 so that a low negative voltage builds up at the capacitive element 26 because of the p-n junction at the gate terminal 13a of the junction FET 13, which is on its source side connected to the reference potential VSS. The reference potential VSS may be a ground potential, for example. The current in the primary coil $L_1$ or 12, is then rendered constant, for example, when the input voltage is present in a stable and constant manner. As a result, the current flow through the primary coil 12 or $L_1$, will also be constant and no voltage will be induced in the secondary coils $L_2$ and $L_3$. As the control terminal 13a of the JFET 13 is connected to the capacitive element 26 or $C_2$, via the inductive element 22, and as same exhibits a negative voltage, as was described above, the current through the JFET and therefore also the current flow through the first coil 12 is reduced. By changing the current flow through the first coil 12, a voltage is again coupled into the feedback circuit 20 via the inductive element 22. This switching cycle may now repeat at a stable input voltage VDD, which implies that what may occur is an exponential behavior for the current flow through the first coil 12 with a time constant $\tau$, which may correspond to the inductivity of the first coil 12 divided by the resistive value of the JFET 13 and the equivalent resistance of the source of the input voltage for the voltage converter circuit 10. $\tau$ may be in the order of microseconds, which is why a high negative voltage may be induced in the inductive element 22 until the current through the first coil 12 has reached its maximum value. At this point, the control terminal 13a of the JFET 13 is coupled to the capacitive element 26, and the JFET 13 can be turned off. This has the effect that the current flow through the first coil 12 decreases until the current flow has again dropped to zero, for example. Then the cycle may start anew. When the voltage across the capacitive element 26 is less than the turn-on threshold voltage of the JFET, the JFET is not turned on any more, and the second transistor 17, e.g. the NMOS $T_2$, is made the switching transistor having a main current flowing across it. The capacitive element 26 can be negatively charged to a stronger extent, and an output capacitance 29 can be charged via the diode $D_3$.

Therefore, in dependence on a change of the energy stored in the induction coil 12, the voltage converter may be excited into self-oscillating oscillations.

Via the capacitive element 24, a voltage may be transferred to the control terminal 17a of the MOSFET transistor 17 so that same, on reaching its turn-on voltage, will take over the current-carrying. I.e., as soon as the voltage at the tap between the induction coil $L_2$ and the third induction coil $L_3$ of the coupled coils, i.e. at the tap of the transformer, is large enough, the MOSFET $T_2$ will switch through and take over the current-carrying. In the process, the capacitive element $C_2$ will be negatively charged so that, in the stationary state, i.e. after the starting phase, a constant negative voltage will be present thereat, and the JFET $T_1$ will be turned off. The capacitor 24c and the capacitor 24a separate the DC voltage proportion from the control or gate terminal of the MOSFET $T_2$ at the tap 22a. An operating frequency of the voltage converter circuit is then, after the starting phase, predominantly determined by the capacitor $C_3$ or 24c and the resistive element 25b or $R_3$. In embodiments of the present invention, the operating frequency may further be influenced by a locked loop 27, as is described in the following.

The locked loop 27 may be configured for controlling the frequency of the clocked converting of an input voltage to an output voltage. For this purpose, the locked loop 27 may be coupled to the control or gate terminal 17a of the MOSFET transistor 17. That is, the frequency of the supplying of energy to the first induction coil 12 and the transferring of energy or charge to an output capacitance 28 of the voltage converter 10 may be controlled by the locked loop 27. In this embodiment, the locked loop 27 is configured such that, in dependence on a charge on the output capacitance 28, a frequency for the clocked coupling and for the transferring of charge from the first coil to the output capacitor 28 is controlled. For this purpose, the gate terminal 17a may be connected to a branch for a negative voltage limitation 27a and a branch for a positive voltage limitation 27b. The branch for the negative voltage limitation 27a may comprise a diode $D_1$ or 30, which is connected, in series with a resistive element 31 or $R_1$, against the reference potential VSS. The branch for a positive voltage limitation 27b may be arranged in parallel thereto. This branch comprises a diode 32, which is connected against the reference potential, in series with a transistor 33. A control terminal or control gate 33a of the transistor 33 $T_7$ may be controlled via a variable resistor 34 $R_6$, i.e., for example, a potentiometer, which is connected in parallel to the output capacitance 28 via a Zener diode 35. By the branch for the positive voltage limitation and the branch for the negative voltage limitation, a gate voltage may therefore be adjusted and limited at the MOSFET transistor $T_2$. In dependence on a load at the output and/or in dependence on a desired output voltage, the resistance of the potentiometer 34 and/or a voltage divider effect of the potentiometer 34 may be changed, which in turn changes the gate voltage at the transistor 33. Thus, in dependence on a load at the output of the DC-DC converter, the gate voltage at the control terminal 33a of the transistor 33 and the control voltage at the second transistor or the MOSFET 17 may be adjusted. By adjusting a channel resistance of the MOSFET 17, in some embodiments a time constant of a gate control signal of the MOSFET $T_2$ may be adjusted. This thus serves to adjust the frequency or a duty cycle of the opening and closing of the transistor 17 and therefore the clocked supplying of energy and/or the transferring of charges to the output capacitance 28.

Therefore, the locked loop 27 may comprise a diode $D_7$, a transistor $T_7$, a Zener diode $D_6$ as well as a voltage divider $R_6$. This locked loop serves to control the on-time of the switching transistor $T_2$. As a result, the operating frequency may change with different loads. For example, the operating frequency may be lower, the higher the load.

The Zener diodes 36 and 37 are protection diodes which, e.g. in the case of a fault, prevent the MOSFET $T_2$ or 17 from receiving impermissibly high voltages at its control or gate terminal. The resistor 31 or $R_1$ serves as an additional starting aid for the converter.

Between the first induction coil 12 and the output capacitance 28, further a switchable rectifier 29 may be arranged. The switchable rectifier 29 may comprise a diode 38 which is arranged in parallel to a transistor $T_3$ or 39, which is switchable via a further control circuit 40 and/or is controlled by same.

For optimizing the efficiency of the circuit, a transistor 39 is switched in parallel to the diode $D_3$ or 38 of the switchable rectifier 29, the transistor taking over the current-carrying when the diode would normally conduct. This may be realized via a control circuit 40, for example.

The controllable transistor 39 may be a PMOS transistor, for example, which exhibits sufficient dead time, i.e. sufficient time during which it is open, so that no overlap of the PMOS transistor $T_3$ or 39, and the second MOSFET $T_2$ may occur.

In some embodiments, high efficiency of the voltage converter circuit may be achieved by a suitable configuration of the transformer, i.e. the coupled coils 12 and 22. The secondary side ($L_2$ and $L_3$) may comprise a tap 22a for optimally controlling the MOSFET transistor $T_2$, i.e. minimizing switching losses, at the same time guaranteeing low starting voltages. The inductivity of the winding of the induction coil 12 or $L_1$ is, in some embodiments, chosen as large as possible so that an open-circuit current of the converter may be kept low compared to the maximum input current. For preventing high numbers of windings and therefore high ohmic losses, core materials having a high absolute magnetic permeability μ may be used. The absolute magnetic permeability μ is the product of the magnetic field constant $\mu_0$ and the relative magnetic permeability $\mu_r$ ($\mu=\mu_0\times\mu_r$). The absolute magnetic permeability μ may, in some embodiments, be larger than $6\times10^{-5}$H/m, e.g. greater than $6.28\times10^{-5}$H/m, which corresponds to a relative magnetic permeability $\mu_r$ of 50. In some embodiments, however, it is seen to it that the saturation of the magnetization of the core is not exceeded. This predominantly depends on the output power and finally on the maximum input current of the converter.

According to embodiments of the present invention, the above-described circuit for a DC-DC up-converter may be constituted solely by discrete devices. For enabling a small size of the voltage converter circuit, all respective devices may, without exception, be available as surface-mounted devices (SMD). For the transformer, i.e. the coils for the inductive coupling, an ER9.5 core of the ferrite material N87 may be used, for example, which has even smaller dimensions compared to the entire circuit. For the converter, i.e. the voltage converter circuit, to start at low input voltages of, e.g., 60 mV, on the one hand the winding ratio of the first induction coil $L_1$ or 12 to the second induction coil $L_2$ and the third induction coil $L_3$ must be chosen to be approximately 1:17. The winding ratio may, however, in dependence on the input voltage of the JFET $T_1$ or the transistor $T_3$, also lie between 1:4 and 1:25, for example. Apart from that, the JFET $T_1$ exhibits, according to magnitude, a lower pinch-off voltage of approximately 1.2 V. It is to be seen to it that the maximum gate-source voltage is dimensioned sufficiently high. In an embodiment, the JFET PMBF4393 by the Philips company may be employed, for example. According to specifications in its datasheet, same exhibits a pinch-off voltage between –3.0 V and –0.5 V and a maximum permissible gate-source voltage of 40 V. In some embodiments, the MOSFET BSH105 by the Philips company may be used as the switching transistor $T_2$. The threshold voltage of this switching transistor amounts to approximately 0.6 V. If the switching transistors indicated are used, it is reasonable, with some embodiments, to dimension the second induction coil $L_2$ and the third induction coil $L_3$ such that they are of exactly the same size.

The voltage converter circuit 10 in FIG. 3 may, in a further embodiment, comprise a protective circuit coupled to the control terminal 17a of the second switch 17 in order to protect the control terminal of the second switch from overvoltage. The protective circuit may take the form of oppositely coupled or poled Zener diodes 36 and 37, which may be connected as shown, for example.

In embodiments of the present invention, the control terminal 17a of the second switch 17 may be coupled to a regulating circuit or locked loop 27, wherein the locked loop is configured for controlling the frequency of the clocked supplying of energy to the energy storage and a transfer of charge from the energy storage to an output capacitance 28 coupled to the energy storage. An output voltage $V_{out}$ is then present at the output capacitance 28. For this purpose, the locked loop 27 may exhibit a positive and a negative current limitation or voltage limitation, wherein the voltage limitation, in dependence on a load or in dependence on an output voltage, may change the positive and/or the negative current limitation or voltage limitation such that the turn-on voltage of the second switch 17 is undershot or exceeded. In other words, the second switch 17 may be turned on or off in dependence on the load.

The switch assembly 15 with the first and second switches connected in parallel may be configured such that the switch assembly exhibits, in the starting phase of the voltage conversion or the voltage converter circuit, a turn-on voltage between 0 V and 100 mV and is active after the starting phase via the second switch so that this current path exhibits a lower resistance than a current path via the first switch $T_1$. In embodiments of the present invention, the first switch may therefore be a normally on transistor, and the second switch may be a normally-off transistor. That is, for example, the first switch may be a JFET and the second switch a MOSFET. However, the first switch 13 may, e.g., also be an n-channel FET of the depletion type, while the second switch 17 is an n-channel FET of the enhancement type. The first switch 17 may, for example, be an n-channel MOSFET having a smaller turn-on voltage or threshold voltage, according to magnitude, while the second switch comprises an n-channel MOSFET having a larger threshold voltage, according to magnitude. What is also conceivable is that, in embodiments, transistors having correspondingly reversed dopings are employed. Different turn-on voltages may also be achieved by different doping profiles, by gate oxides of different thicknesses or by other design parameters of the field-effect transistors (FETs), for example.

In another embodiment of the present invention, the voltage converter circuit may further comprise a feedback circuit 27, which is configured for providing, in dependence on a change of the energy stored in the energy storage 12 or in dependence on an amount of the energy stored in the energy storage, a feedback signal. The feedback circuit 27 may comprise a switchable coupling element 24 configured for coupling the feedback signal to the control terminal 17a of the second switch 17, the switchable coupling element 24 being configured for providing a stronger coupling effect in a starting phase than after the starting phase.

According to a further embodiment of the present invention, the switch assembly 15 may be configured such that, in a starting phase, the first coil 12 may be coupled to the reference potential VSS via the first switch or via the first transistor 13 so that a current flow through the first coil 12 may take place and a voltage may be induced in the feedback circuit 20. After the starting phase, i.e. when the first switch 13 is permanently open, for example, or even as soon as during the starting phase, a current flow through the coil may be generated and enabled by closing the second switch 17 so that a voltage may be induced in the feedback circuit 20.

The voltage converter circuit may be configured in the form of a voltage converter providing an output voltage $V_{out}$ at an output. The voltage converter may comprise an output capacitor for temporarily storing charge, i.e. energy. The voltage converter may also be configured such that the second switch 17 enables a clocked coupling of the coil to the reference potential after the starting phase, whereby current will flow through the coil, the current supplying magnetic energy to the coil, the energy then being transferred from the coil 12 to the output capacitor 28 in the form of charges in a phase clocked oppositely relative to the clocked coupling. For this purpose, a rectifying element, such as a diode or a switchable rectifying element 29 may be coupled between the coil 12 and the output capacitor 28. The output capacitor 28 may be charged via the switchable rectifying element 29.

The feedback circuit 20 may be configured such that the capacitive element 26 or $C_2$ is used for turning off the first switch or the junction FET. This means that, if a voltage across the capacitive element 26 is less than a turn-on or threshold voltage of the first switch $T_1$ or the first junction FET, same is permanently turned off, and the second transistor $T_2$, which may be an NMOS transistor, is made the active switching transistor. The capacitive element 26 may then continue to be negatively charged.

Figure 4:
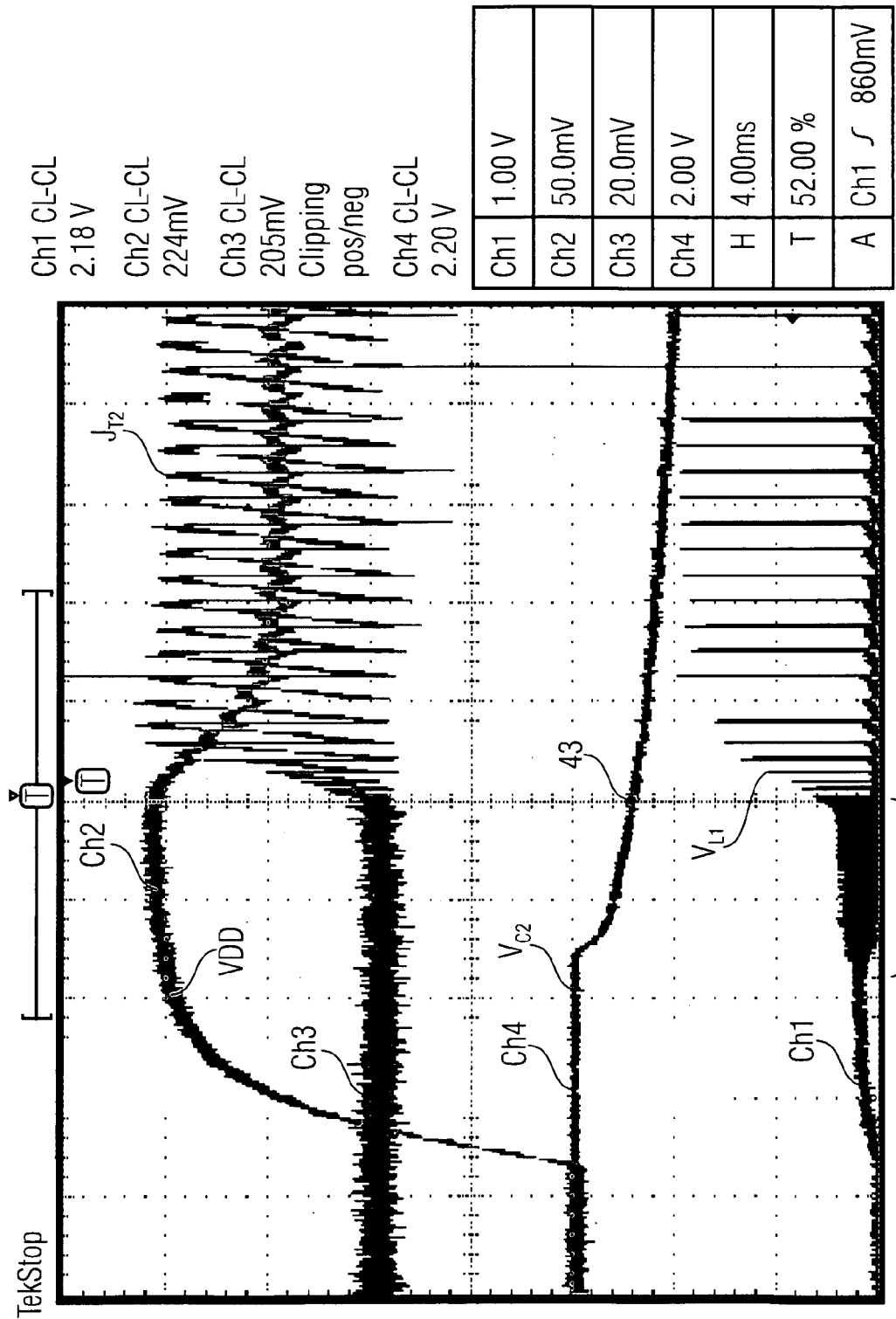
FIG. 4 shows current/voltage measured curves at different switching-circuit positions of the voltage converter circuit of FIG. 3.

In FIG. 4, the measured current/voltage courses at different measuring points of the voltage converter circuit of FIG. 3 are illustrated. The time is plotted in milliseconds on the x axis of the diagram, wherein an interval corresponds to 4 ms. On the y axis, the input voltage VDD, the current through the second switch $I_{T2}$ as well as the voltage $V_{L1}$ at the first coil 12 and the voltage $V_{C2}$ at the capacitive element 26 of the feedback circuit 20 are illustrated. In the diagram, current and voltage values, beginning with the starting phase and ending after the starting phase, i.e. in the operating phase of the clocked conversion of the input voltage, are illustrated. As can be seen in the curve VDD, the input voltage first rises for a certain period of time after turning on so that, in this period of time, a time-variable current may flow to the reference potential via the electrically conducting first transistor $T_1$ so that a voltage may be induced in the feedback circuit 24 and negative voltage builds up at the capacitive element 26, as is described above and can be seen in the measured curve $V_{C2}$. After the input voltage VDD has become constant or a time variation of the current through the first coil has become sufficiently small, this negative voltage will have the effect that a negative potential from the capacitive element 26 will be present at the gate terminal 13a of the first transistor $T_1$, with the result that the first transistor is turned off. This causes a reduction of the current in the first coil 12, which can be seen in the voltage curve $V_{L1}$ in the region 42. The current in the coil decreasing again results in a voltage induction, and the cycle may start anew. This means that the voltage at the first coil 12 oscillates, as can be seen in section 42. As soon as the voltage in the capacitive element 26 or $C_2$ has reached the pinch-off or threshold voltage of the first transistor $T_1$ or a voltage effecting a permanent pinching-off of the first transistor $T_1$, the transistor $T_1$ is turned off and the second transistor $T_2$ takes over the current-carrying, as can be seen in the current curve $I_{T2}$. As described above, after the starting phase, a self-oscillating oscillation occurs due to the feedback loop 24, i.e. the switch $T_2$ serves to supply energy to the induction coil in a clocked manner. In this diagram, this is made clear by the oscillating current $I_{T2}$, which is caused by turning the transistor 17 on and off. As a consequence, an oscillating voltage behavior also forms at the induction coil, as can be seen in the voltage curve $V_{L1}$ in FIG. 4.

Figure 5:
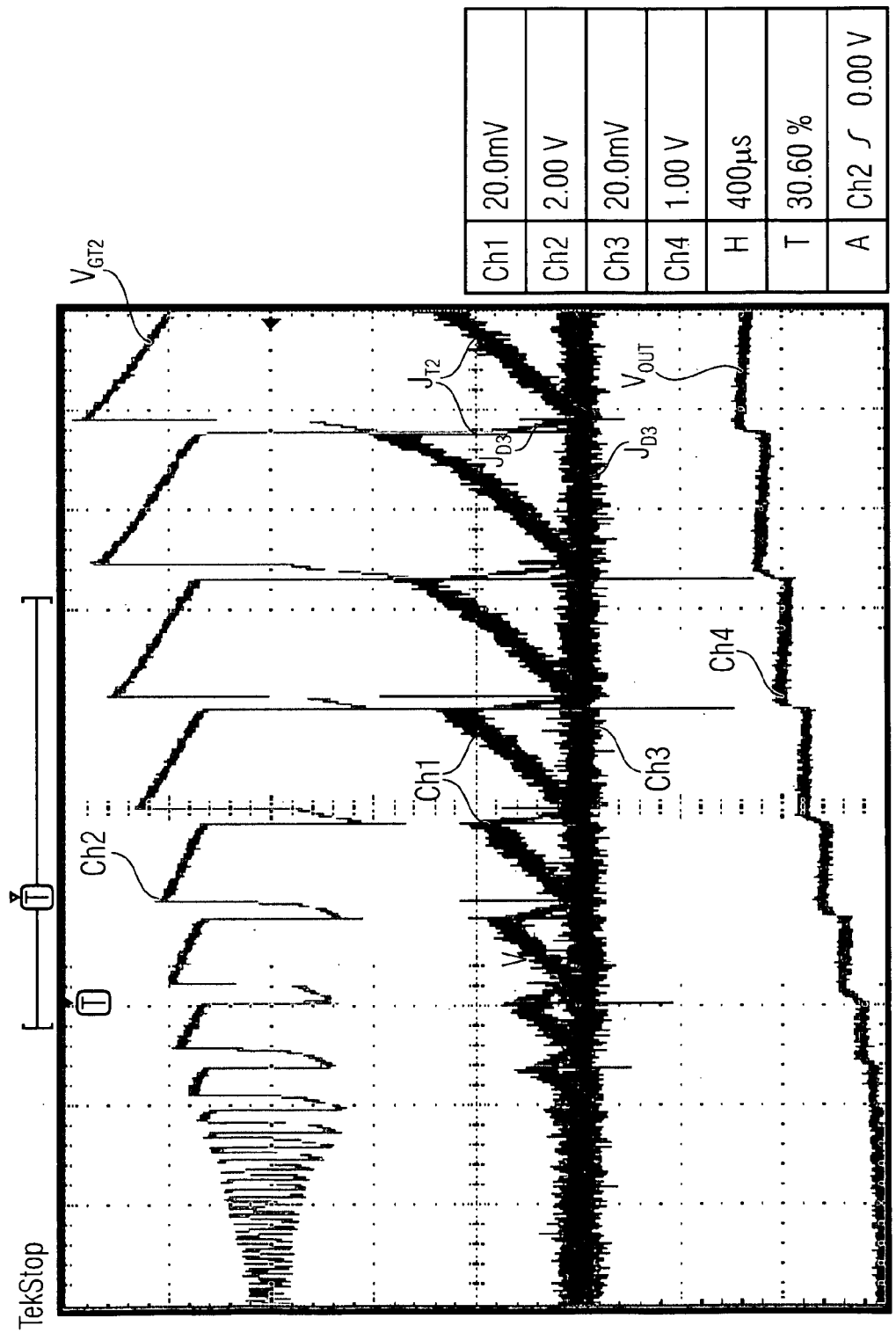
FIG. 5 shows further current/voltage measured curves at the beginning of the clocked operating phase of the voltage converter circuit according to FIG. 3.

FIG. 5 shows the measured curves of a control or gate voltage $V_{GT2}$, the current $I_{T2}$ in the current-carrying channel of the second transistor, as well as a current through the diode D3, which is illustrated in the curve $I_{T3}$. Beyond that, the output voltage $V_{out}$ that is available at the output capacitance 28 is represented. The time scale for these measurement is 400 µs per unit of interval, as can be seen in FIG. 5. The current and voltage values in FIG. 5 are illustrated in the starting phase, in which the second transistor $T_2$ takes over the current-carrying. Accordingly, the output voltage $V_{out}$ first builds up step by step. In the different measured curves, the clocked converting is easily recognizable. In the phases in which the second transistor is turned on, i.e. when a higher voltage than the turn-on voltage is present at the control terminal of the second transistor, a significant current $I_{T2}$ flows through the transistor. After undershooting the turn-on voltage at the gate of the second transistor, the current flow through the second transistor stops abruptly, which can be seen in curve $I_{T2}$. In the phase in which the second transistor $T_2$ is turned off, the energy or charge stored in the first coil 12 is transferred to the output capacitance 28 via the controllable rectifier 29, as can be seen in the curve shape $I_{D3}$. This transfer of charge takes place "in portions", as can be seen from the step-shaped increase in the output voltage $V_{out}$, so that the output voltage is raised step by step at the respective positions and/or at the respective points in time.

Figure 6:
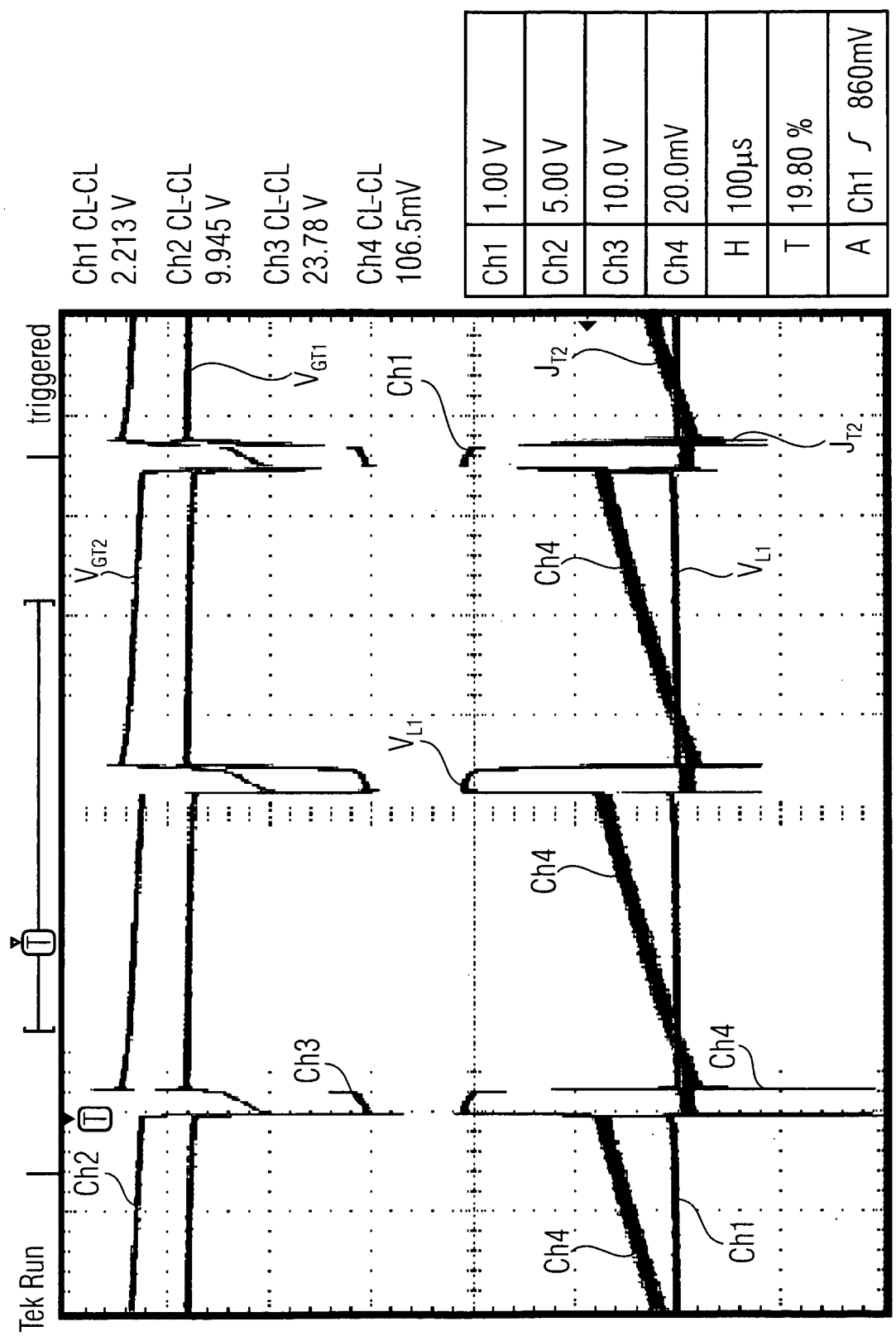
FIG. 6 is a graphic representation of a clocked voltage course at the control terminals of the first and second switches, as well as at the first coil, and of the respective current in the second transistor, during an operating phase of the voltage converter circuit.

FIG. 6 shows further measurements of current and voltage at different points of the voltage converter circuit of FIG. 3 during the operating phase. The time resolution for these measurements amounts to 100 µs per interval of time. The voltage converter circuit now, in the operating phase, periodically operates with an adjustable operating frequency, as explained above. The voltage at the control terminal of the first transistor $T_1$ is illustrated in the curve $V_{GT1}$, and the voltage at the control terminal of the second transistor $T_2$ is illustrated in the curve $V_{GT2}$. The respective current through the second transistor $T_2$ and the respective voltage across the first coil 12 exhibit the same periodicity. As can be seen from both curves $V_{L1}$ and $I_{T2}$, the voltage across the first coil $L_1$ correspondingly increases at the times when the current flow through the second transistor is interrupted. Due to the rise in voltage in the first coil, now the charge may be transferred to the output capacitance via the switchable rectifier 29 coupled in series. This means that the threshold voltage of the diode $D_3$ of the switchable rectifier 29 will be exceeded, and the diode will switch through. For optimizing efficiency, a transistor may now be connected in parallel to the diode $D_3$, as has been shown in embodiments, the transistor taking over the current-carrying when the diode would normally conduct. As the transistor has a lower "on" resistance, i.e. a lower resistance in the turned-on state, than the diode, the efficiency of the voltage converter circuit may be increased by this measure.

Figure 7:
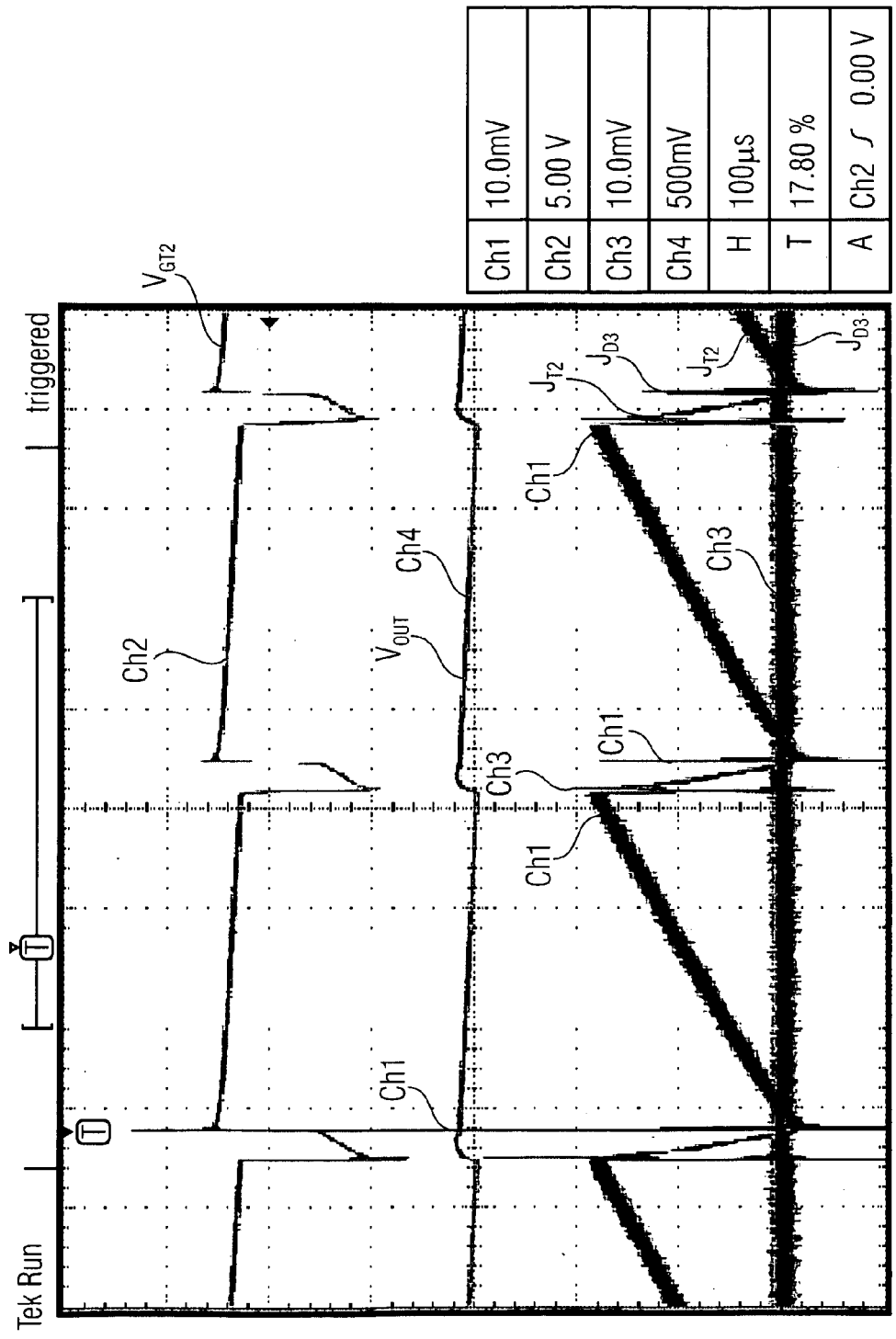
FIG. 7 shows measured current/voltage measured curves of the output voltage, the control voltage as well as a graphic representation of the clocked current course via the second switch and via a rectifying diode, according to the embodiment in FIG. 3.

FIG. 7 shows further current or voltage measured curves at different measuring points of the voltage converter in FIG. 3. The current/voltage curves were again measured during the clocked operating phase, i.e. after the starting phase. The output voltage $V_{out}$ now exhibits an approximately constant value. The output capacitance 28 is supplied with charge from the first coil 12 at those times when the second transistor $T_2$ is turned off, i.e. when the gate voltage $V_{GT2}$ is reduced, with the result that the output voltage slightly rises again. This can be seen from the fact that, in the phase when the current $I_{T2}$ through the transistor decreases, the current $I_{D3}$ flows onto the output capacitance 28 via the diode $D_3$.

The embodiments and measured curves in the diagrams 4 to 7 clearly show that the starting phase and the operating phase may temporally overlap. I.e., in a transition period, both the first switch 13 and the second switch 17 may be active.

In some embodiments, after the starting phase, both the control terminal of the first transistor and the control terminal of the second transistor may be controlled in order to turn the transistors on. However, due to its lower "on" resistance, the second transistor, for example, will in this case take over a main current flow. For example, a current flow through the second transistor may be at least five times the one through the first transistor.

Apart from that, the present invention provides a method of the clocked supplying of energy to an energy storage based on an input voltage present an input of a voltage converter circuit. As is schematically represented in the block diagram of FIG. 8, the method comprises a step of supplying 80 energy to the energy storage of the voltage converter circuit in a starting phase, by activating a first switch, the first switch exhibiting, according to magnitude, a smaller turn-on threshold voltage than the second switch. The method further comprises a supplying 85 of energy to the energy storage of the voltage converter circuit in a clocked manner after the starting phase, by activating the second switch. The second switch, which is connected in parallel to the first switch, exhibits, according to magnitude, a higher turn-on voltage than the first switch.

The clocked supplying 85 of energy may be conducted, for example, such that the voltage converter or the voltage converter circuit is excited into self-oscillating oscillations so that the first and/or the second switch is periodically turned off and on and so that, thereby, energy is supplied to the energy storage. The energy storage may be an induction coil, for example. Therefore, by closing the first or second switch, a time-variable current flow may be caused in the induction coil, which may be interrupted cyclically, for example, and which effects a temporary storage of respective magnetic energy in the form of a magnetic field in the induction coil. This means that, in embodiments of the present invention, the energy storage may also be regarded as a temporary storage.

According to a further embodiment of the present invention, the clocked supplying 85 of energy to the energy storages may also comprise, in the phases clocked oppositely to the clocked phases, transferring charges to a second energy storage, e.g. the output capacitor 28 of the voltage capacitor. For example, the transferring of charges may be effected in a manner temporally offset to the clocked supplying, e.g. such that the transferring of charges and the clocked supplying are effected alternately and temporally not overlapping. The clocked supplying of energy to the energy storage and/or of energy to the output capacitor may, according to a further embodiment, be effected such that the frequency for this clocked process is adjustable by a load at the output capacitor.

In another embodiment of the method for the clocked supplying of energy to an energy storage, the supplying of energy 80 and 85 to the energy storage may be conducted such that a feedback between the first and second switches and the energy storage is performed by a change in the energy in the energy storage or by an amount of energy in the energy storage so that a self-oscillating oscillation may be induced in the voltage converter circuit.

The method of the clocked supplying of energy may be conducted such that the supplying 80 of energy to the energy storage of the voltage converter circuit is conductable at an input voltage that is, according to magnitude, less than 300 mV or even less than 100 mV. In embodiments, the method is conducted such that, in a starting phase, the supplying of energy to the energy storage is performed with the first transistor, which exhibits a lower turn-on voltage than the second transistor, and that, after the starting phase, the supplying of energy is performed by a second transistor or at least substantially by the second transistor, which exhibits a lower "on" resistance than the first transistor.

Therefore, in some embodiments, the first transistor may be configured in the form of a normally on JFET, for example, wherein the supplying of energy to the energy storage may already begin as of an input voltage of, according to magnitude, higher than 0 V and/or at a gate-source voltage of 0 V.

Figure 8:
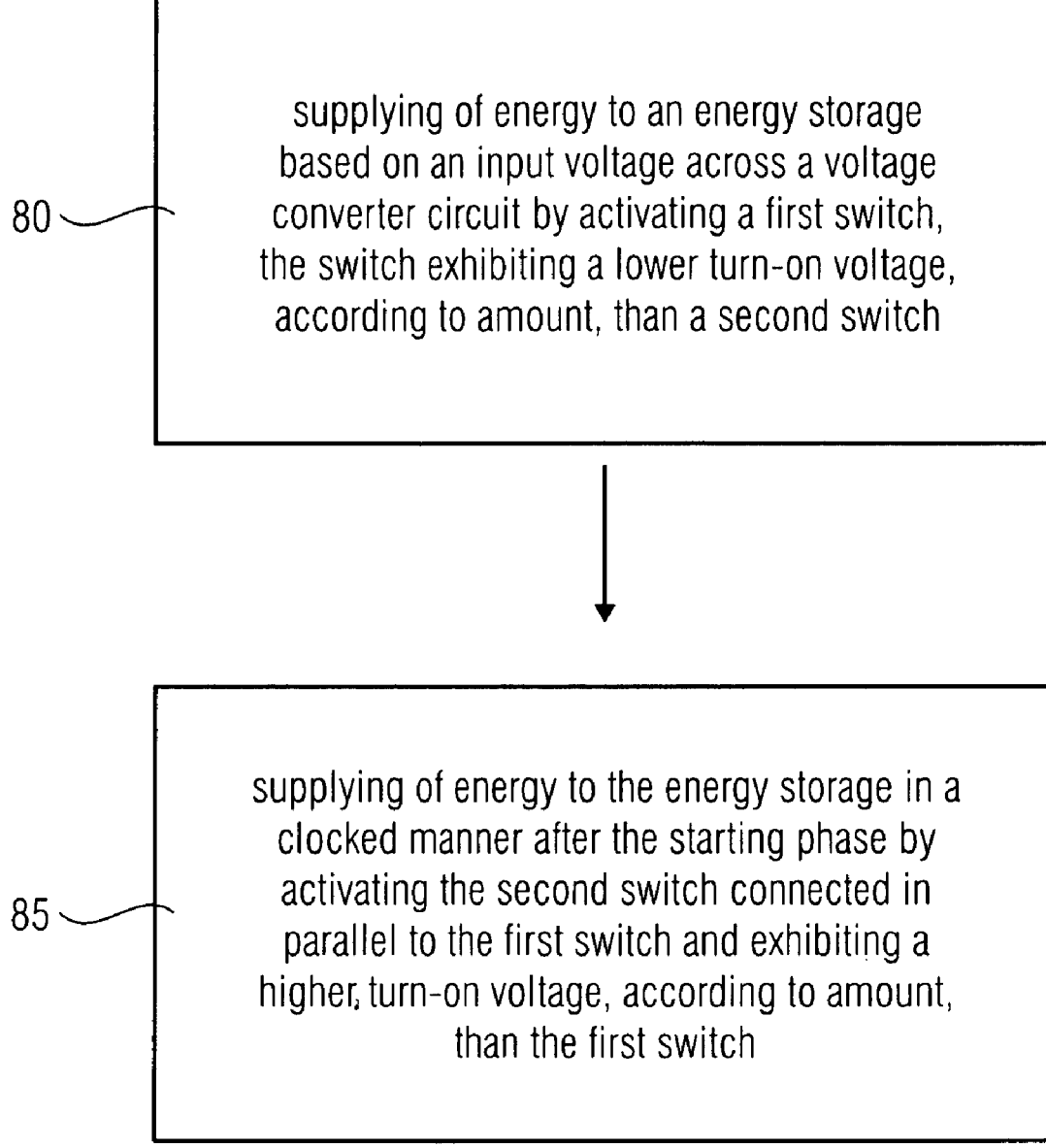
FIG. 8 is a flowchart of a method of a clocked supplying of energy to an energy storage, according to an embodiment of the present invention.

In addition, the method according to FIG. 8 may be supplemented by all those functionalities and features that are described herein, also with respect to embodiments of the apparatus.

According to embodiments, the voltage converter presented may operate with coupled coils and start at an input voltage of as little as 60 mV, for example. Additionally, the voltage converter, having small dimensions, may exhibit as much as more than 50 percent efficiency at an output voltage of 2 V and an output power of 1 mW. The voltage converter presented herein or the voltage converter circuit presented herein serves to achieve high efficiency of the voltage conversion at very low input voltages (below 300 mV). As illustrated in embodiments, the circuit may be built of individual devices, i.e. it is not necessary to use an integrated circuit. The device expenditure may still be relatively low. As embodiments show, the demand on the transformer to be used, i.e. the coupled coils, may be high, but, with appropriate choice of the devices and the core materials, as a whole, small dimensions of the entire assembly are achievable. It is, of course, also conceivable to realize the voltage converter circuit or the voltage converter entirely or at least partly in the form of an integrated circuit.

According to embodiments, the voltage converter circuit may be configured in the form of a synchronous step-up converter, i.e. an up-converter having a feedback loop enabling regulation of the output voltage during the operating phase, or in the form of a boost chopper.

It is, however, also conceivable to configure a correspondingly modified voltage converter circuit as a buck chopper having an output voltage smaller than the input voltage.

Furthermore, it is to be noted that, in embodiments of the present invention, the feedback circuit may comprise a switchable coupling element (24), which may be configured in the form of a switchable capacitive element.

As embodiments show, after the starting phase, a second MOSFET transistor $T_2$, which is connected in parallel to a JFET transistor $T_1$, may serve as a switching element for the clocked conversion of the voltage. The parallel connection of the two transistors allows on the one hand using a lower input voltage for the starting process of the voltage converter as the first transistor may be normally on and may exhibit a "zero threshold gate voltage", i.e. a 0-volt threshold voltage, and on the other hand exhibiting high efficiency during the operating phase as the second MOSFET 17 exhibits a low "on" resistance in the turned-on state.

The invention claimed is:

1. A voltage converter circuit for the clocked supplying of energy to an energy storage based on an input voltage present at an input of the voltage converter circuit, comprising:
   an energy storage; and
   a switch assembly, the switch assembly comprising a first switch and a second switch connected in parallel, and the switch assembly being coupled to the energy storage;
   wherein the first switch exhibits, according to magnitude, a smaller turn-on voltage than the second switch;
   wherein a control terminal of the first switch is switched such that the first switch is active in a starting phase of the voltage converter circuit in order to supply the energy storage with energy; and
   wherein a control terminal of the second switch is switched such that the second switch is active after the starting phase in order to supply the energy storage with energy in a clocked manner.

2. The voltage converter circuit according to claim 1, wherein the energy storage is a coil;
   wherein the voltage converter circuit comprises a feedback circuit;
   wherein the feedback circuit comprises an inductive element magnetically coupled to the coil so that, by changing the energy stored in the coil, a voltage is induced in the inductive element.

3. The voltage converter circuit according to claim 2, wherein the feedback circuit comprises a switchable capacitive element configured to couple the voltage induced in the inductive element to the control terminal of the second switch,
   wherein the switchable capacitive element is configured for providing a stronger coupling effect in a starting phase than after the starting phase.

4. The voltage converter circuit according to claim 3, wherein the switchable capacitive element comprises a third switch switched such that the switchable capacitive element provides a stronger coupling effect in the starting phase than after the starting phase.

5. The voltage converter circuit according to claim 4, wherein the third switch is configured as a junction field-effect transistor, the control terminal of which is coupled to the energy storage such that the third switch is active in the starting phase in order to effect a stronger coupling than after the starting phase.

6. The voltage converter circuit according to claim 4, wherein the third switch is switched such that a coupling effect of the switchable capacitive element on the control terminal of the second transistor is periodically altered during the starting phase.

7. The voltage converter circuit according to claim 4, wherein the voltage converter circuit further comprises a capacitive element configured for building up, in dependence on a change of the energy in the energy storage or the amount of energy in the energy storage, a potential effecting a turning off of the third switch.

8. The voltage converter circuit according to claim 4, wherein the third switch comprises a rectifying barrier-layer junction from a control terminal to a load-path terminal; and
   wherein the voltage converter circuit further comprises a capacitive element configured for building up a potential effecting a turning off of the third switch utilizing a rectifying effect of the barrier-layer junction of the third switch, or for building up the potential effecting a turning off of the third switch utilizing a rectifying effect of a barrier-layer junction of the first transistor.

9. The voltage converter circuit according to claim 2, wherein the feedback circuit is configured for controlling the control terminal of the first switch;
   wherein the feedback circuit is configured for controlling, in a starting phase, the control terminal of the first switch, which is coupled to the inductive element, such that the coil is supplied with energy by the first switch; and
   wherein the feedback circuit is configured for building up, during the starting phase, by a voltage induced in the inductive element, a potential effecting a turning off of the first switch.

10. The voltage converter circuit according to claim 2, wherein the feedback circuit is configured for controlling the first switch in the starting phase such that a supplying of energy to the coil is periodically interrupted by the first switch, and wherein the feedback circuit is configured for building up, during the starting phase, the potential effecting a turning off of the first switch such that the periodic turning on and off of the first switch is prevented.

11. The voltage converter circuit according to claim 2, wherein the feedback circuit comprises a capacitive element coupled to the inductive element, wherein the voltage converter circuit is configured for charging the capacitive element to a steady component so that, after the starting phase, a potential is present at the capacitive element that terminates the supplying of energy to the coil by the first switch.

12. The voltage converter circuit according to claim 2, wherein the first switch comprises a rectifying barrier-layer junction from a control terminal to a load-path terminal; and wherein the feedback circuit is configured for building up the potential effecting a turning off of the first switch utilizing a rectifying effect of the barrier-layer junction.

13. The voltage converter circuit according to claim 1, wherein the energy storage is a coil inductively coupled to an inductive element of a feedback circuit so that, in dependence on a change of the energy stored in the coil, a self-oscillating oscillation is excitable in the voltage converter circuit.

14. The voltage converter circuit according to claim 13, wherein the frequency of the self-oscillating oscillation for the clocked supplying of energy to the energy storage depends on a resistor-capacitor time constant.

15. The voltage converter circuit according to claim 1, wherein the energy storage is coupled to a feedback circuit such that, in dependence on a change of the energy stored in the energy storage or in dependence on an amount of the energy stored in the energy storage, a feedback signal is generated that excites the voltage converter circuit into self-oscillating oscillations.

16. The voltage converter circuit according to claim 1, wherein the control terminal of the second switch is coupled to a locked loop configured for influencing the frequency of the clock supplying of energy to the energy storage.

17. The voltage converter circuit according to claim 1, when the energy storage is coupled, via a switched rectifier, to an output capacitance configured for providing, in dependence on a charge transferred from the energy storage, an output voltage higher than an input voltage present at an input of the voltage converter circuit.

18. The voltage converter circuit according to claim 17, wherein the control terminal of the second switch is switched such that the second switch is active after the starting phase in order to supply the energy storage with energy in a clocked manner; and wherein the voltage converter circuit is configured for transferring charge from the energy storage to the output capacitance in order to provide an output voltage at the output capacitance when the second switch is open.

19. The voltage converter circuit according to claim 18, wherein the control terminal of the second switch is coupled to a locked loop configured for controlling, in dependence on a load at the output capacitance (28), a frequency for the clocked supplying of energy to the energy storage and for transferring charges from the energy storage to the output capacitance.

20. The voltage converter circuit according to claim 19, wherein the locked loop is configured for reducing the frequency the higher the load at the output capacitance.

21. The voltage converter circuit according to claim 1, further comprising a protective circuit coupled to the control terminal of the second switch and configured for protecting the second switch from overvoltage.

22. The voltage converter circuit according to claim 21, wherein the protective circuit comprises two oppositely coupled Zener diodes.

23. The voltage converter circuit according to claim 1, wherein the control terminal of the second switch is coupled to a locked loop;

wherein the locked loop is configured for influencing a frequency of the supplying of energy to the energy storage and of the transferring of a charge from the energy storage to an output capacitance coupled to the energy storage and at which an output voltage is available;

wherein the locked loop exhibits a positive voltage limitation or a negative voltage limitation; and wherein the locked loop is configured for changing a voltage limitation value of the voltage limitation or a response of the voltage limitation in dependence on a load at the output capacitance in order to thus change a ratio of a turn-on time of the second switch to a turn-off time of the second switch.

24. The voltage converter circuit according to claim 1, wherein the first switch comprises a normally on transistor, and wherein the second switch comprises a normally-off transistor.

25. The voltage converter circuit according to claim 1, wherein the second switch has a lower "on" resistance than the first switch.

26. The voltage converter circuit according to claim 1, wherein the feedback circuit is configured for enabling an oscillation build-up already at an input voltage of less than 100 mV.

27. The voltage converter circuit according to claim 1, wherein the first switch is a junction field-effect transistor (JFET), and wherein the second switch is a metal-oxide semiconductor field-effect transistor (MOSFET).

28. A voltage converter circuit for the clocked supplying of energy to an energy storage, based on an input voltage present at an input of the voltage converter circuit, comprising:

an energy storage;
a switch assembly;
wherein the switch assembly comprises a first switch and a second switch connected in parallel,
wherein the switch assembly is coupled to the energy storage,
wherein the first switch exhibits, according to magnitude, a lower turn-on voltage than the second switch,
wherein a control terminal of the first switch is switched such that the first switch is active in a starting phase of the voltage converter circuit in order to supply the energy storage with energy, and
wherein a control terminal of the second switch is switched such that the second switch is active after the starting phase in order to supply the energy storage with energy in a clocked manner; and
a feedback circuit configured for providing, in dependence on a change in the energy stored in the energy storage or in dependence on an amount of the energy stored in the energy storage, a feedback signal,
wherein the feedback circuit comprises a switchable coupling element configured for coupling the feedback signal to the control terminal of the second switch,
wherein the switchable coupling element is configured for providing a stronger coupling effect in a starting phase than after the starting phase.

29. Voltage converter for the clocked converting of an input voltage present at an input of the voltage converter to an output voltage available at an output of the voltage converter, comprising:
- a first coil, wherein a terminal of the coil is coupled to the input of the voltage converter;
- a controllable rectifying element connected in series with the first coil;
- an output capacitor connected to the controllable rectifying element and configured for storing a charge so that an output voltage is available at the output capacitor; and
- a switch assembly;
- wherein the switch assembly is configured for coupling the first coil to a reference potential in order to supply the first coil with energy;
- wherein the switch assembly comprises a first transistor and a second transistor connected in parallel;
- wherein the first transistor exhibits, according to magnitude, a smaller threshold voltage than the second transistor;
- wherein a control terminal of the first transistor is switched such that the first transistor is active in a starting phase of the voltage converter in order to enable a coupling of the first coil to the reference potential in order to build up a current flow through the first coil;
- wherein a control terminal of the second transistor is switched such that the second transistor enables, after the starting phase, a clocked coupling of the first coil to the reference potential; and
- wherein the controlled rectifying element is configured for transferring charges from the first coil to the output capacitor when the switch assembly is turned off.

30. The voltage converter according to claim 29, wherein the first transistor is configured as a junction field-effect transistor (JFET), and wherein the second transistor is configured as a metal-oxide semiconductor transistor (MOSFET); and
- wherein the voltage converter is configured for coupling, in the starting phase, the first coil to the reference potential via the JFET so that, at the beginning of the starting phase, a current flow through the JFET is at least five times a current flow through the MOSFET, and
- for performing, after the starting phase, a clocked converting of an input voltage to an output voltage utilizing the MOSFET so that, after the starting phase, a current flow through the MOSFET is at least ten times a current flow through the JFET.

31. The voltage converter according to claim 30, wherein an "on" resistance of the JFET is at least five times an "on" resistance of the MOSFET.

32. The voltage converter according to claim 29, wherein the voltage converter further comprises a feedback circuit,
- wherein the feedback circuit comprises a second coil and a third coil inductively coupled to the first coil,
- wherein a tap between the second coil and the third coil is connected to parallelly connected capacitances,
- wherein one of the capacitances is switchable via a capacitance-switching junction field-effect transistor (JFET),
- wherein a terminal of the third coil is coupled to the control terminal of the first transistor and to a control terminal of the capacitance-switching junction field-effect transistor; and
- wherein a terminal of the second coil is coupled to a reference potential via a resistance-capacitance member,
- wherein the two parallelly connected capacitances are configured for effecting a stronger coupling between the tap and the control terminal of the second transistor in the starting phase than after the starting phase in order to couple a feedback signal from the tap to the control terminal of the second transistor.

33. The voltage converter according to claim 29, wherein the voltage converter is configured such that, due to an inductive coupling of the first coil to the second and third coils, a feedback circuit of the voltage converter is excitable into self-oscillating oscillations.

34. The voltage converter according to claim 29, wherein the voltage converter is configured such that the self-oscillating oscillation starts as early as at an input voltage lower, according to magnitude, than a turn-on voltage of the second transistor; and
- wherein the voltage converter is configured for coupling, in the starting phase, a feedback signal to the control terminal of the second transistor so that a voltage across the control terminal of the second transistor reaches the turn-on voltage of the second transistor, wherein the input voltage is lower than the threshold voltage of the second transistor.

35. The voltage converter according to claim 29, wherein the controllable rectifying element comprises a diode having a controllable transistor connected in parallel thereto.

36. The voltage converter according to claim 29, wherein the control terminal of the second transistor is coupled to a locked loop configured for controlling, in dependence on a load at the output capacitor, a frequency for the clocked coupling and transferring of charge from the first coil to the output capacitor,
- wherein the control terminal of the second transistor is wired up with a first branch for a negative voltage limitation, the first branch comprising a diode and a resistive element connected between the control terminal of the second transistor and the reference potential,
- and wherein the control terminal is wired up with a second branch for a positive voltage limitation, the second branch comprising a diode and an adjustable resistive element connected between the control terminal of the second transistor and the reference potential;
- wherein the adjustable resistive element comprises a regulating transistor, the load path of which exhibits an adjustable resistance,
- wherein the regulating transistor is switched such that a resistance of the load path of the regulating transistor depends on the output voltage of the voltage converter.

37. The voltage converter according to claim 29, wherein the voltage converter is constructed of discrete electric devices.

38. The voltage converter according to claim 29, wherein the voltage converter comprises a feedback circuit for the generation of control signals for the first switch and the second switch,
- wherein the feedback circuit is inductively coupled to the first coil via second and third coils, and
- wherein the winding ratio of the first coil to the second and third coils lies between 1:4 and 1:25.

39. The voltage converter according to claim 29, wherein the voltage converter comprises a feedback circuit,
- wherein the feedback circuit is inductively coupled to the first coil via second and third coils, and wherein the first, second and third coils comprise a coil core material with an absolute magnetic permeability higher than $6.28 \times 10^{-5}$ H/m.

40. The voltage converter according to claim 29, wherein the voltage converter further comprises a voltage protective circuit connected between the control terminal of the second transistor and the reference potential, the voltage protective circuit comprising two oppositely coupled Zener diodes.

41. A method of the clocked supplying of energy to an energy storage, based on an input voltage present at an input of a voltage converter circuit, comprising:

supplying energy to the energy storage of the voltage converter circuit in a starting phase by activating a first switch; and supplying energy to the energy storage of the voltage converter circuit in a clocked manner after the starting phase by activating a second switch connected in parallel to the first switch, the second switch exhibiting, according to magnitude, a higher turn-on voltage than the first switch.

42. The method according to claim 41, wherein the supplying of energy to the energy storage in a clocked manner includes exciting a self-oscillating oscillation of the voltage converter circuit.

43. The method according to claim 41, wherein the supplying of energy to the energy storage of the voltage converter circuit in the starting phase and the supplying of energy in a clocked manner after the starting phase includes a coupling of feedback signals based on a change of the energy in the energy storage to control terminals of the first switch and the second switch.

44. The method according to claim 41, wherein the supplying of energy in a clocked manner comprises a load-dependent controlling of a control terminal of the second switch by a locked loop, wherein an operating frequency of the voltage converter circuit is the lower, the higher the load coupled to an output of the voltage converter circuit.

45. The method according to claim 41, wherein the supplying of energy to the energy storage in a starting phase and the supplying of energy in a clocked manner after the starting phase is performed at an input voltage less than 300 mV or less than 250 mV.

46. The method according to claim 41, wherein the supplying of energy to the energy storage after the starting phase is effected such that a current flow through the second switch is at least ten times a current flow through the first switch.

* * * * *